(12) United States Patent  
Luo et al.

(10) Patent No.: US 7,984,935 B2
(45) Date of Patent: Jul. 26, 2011

(54) ELECTRONIC DEVICE WITH LATCHING MECHANISM

(75) Inventors: Yong-Ping Luo, Shenzhen (CN); Jia-Gui Xu, Shenzhen (CN); Qi-Mi Huang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 838 days.

(21) Appl. No.: 11/956,344

(22) Filed: Dec. 14, 2007

(65) Prior Publication Data
US 2008/0239647 A1    Oct. 2, 2008

(30) Foreign Application Priority Data
Mar. 27, 2007    (CN) .......................... 2007 1 0200331

(51) Int. Cl.
*E05C 19/06*    (2006.01)
*E05C 19/00*    (2006.01)

(52) U.S. Cl. .............. 292/80; 292/81; 292/87; 292/202; 292/DIG. 11; 312/223.1

(58) Field of Classification Search .................. 292/80, 292/81, 84, 87, 89, 202, 209, 303, DIG. 11, 292/DIG. 38, DIG. 63; 312/215, 223.1, 223.2; 174/50
See application file for complete search history.

(56) References Cited

U.S. PATENT DOCUMENTS

| | | | | | |
|---|---|---|---|---|---|
| 278,354 | A | * | 5/1883 | Miller | 292/80 |
| 305,402 | A | * | 9/1884 | Otto | 292/80 |
| 564,661 | A | * | 7/1896 | Tollner | 292/87 |
| 785,380 | A | * | 3/1905 | Ripson | 292/80 |
| 4,344,646 | A | * | 8/1982 | Michel | 292/87 |
| 4,759,466 | A | * | 7/1988 | Chase et al. | 220/4.02 |
| 4,964,661 | A | * | 10/1990 | Cadwell et al. | 292/87 |
| 5,233,506 | A | * | 8/1993 | Semenik et al. | 361/814 |
| 5,657,893 | A | * | 8/1997 | Hitchings | 220/326 |
| 5,931,514 | A | * | 8/1999 | Chung | 292/89 |
| 5,964,513 | A | * | 10/1999 | Korinsky et al. | 312/223.2 |
| 5,971,507 | A | * | 10/1999 | Peroni | 312/223.2 |
| 6,315,142 | B1 | * | 11/2001 | Kitamura et al. | 220/4.02 |
| 7,681,755 | B2 | * | 3/2010 | Roesler | 220/788 |
| 7,791,879 | B2 | * | 9/2010 | Jiang et al. | 361/679.58 |
| 2010/0089604 | A1 | * | 4/2010 | Tang | 174/50 |
| 2010/0090568 | A1 | * | 4/2010 | Tang | 312/223.1 |

* cited by examiner

*Primary Examiner* — Carlos Lugo
(74) *Attorney, Agent, or Firm* — Frank R. Niranjan (57) ABSTRACT

An exemplary latching mechanism for connecting a first component (20) and a second component (40). The latching mechanism includes at least one first engaging portion (408) formed/defined on the second component, at least one latch holder (60a, 60b) fixed relative to the first component, and at least one first latching member (80a, 80b). A first latch-clasping piece (604) extends from the at least one latch holder. The at least one first latching member has at least one second engaging portion (806). The second engaging portion engages with the first engaging portion of the second component. The first engaging portion of the second component and the first latching member are disposed between the first latch-clasping piece of the latch holder and the first component. The present invention further provides an electronic device employing the latching mechanism.

8 Claims, 8 Drawing Sheets

ELECTRONIC DEVICE WITH LATCHING MECHANISM

BACKGROUND OF THE INVENTION

1. Field of the Invention

The present invention relates to electronic devices, particularly to an electronic device with latching mechanism.

2. Discussion of the Related Art

Components of electronic devices are generally protected by a housing. The housing surrounds or encloses the electronic parts to be protected. Most housing are not a single integral body but are several parts assembled together by latching mechanisms to form an integrated unit. If the latching mechanisms are easily detachable from the housing the protection offered by the housing may be compromised.

A typical latching mechanism used in electronic devices may includes screws or nuts and bolts for connecting the housings together. However, the screws or nuts and bolts are unsightly and may affect the overall appearance of the electronic device. In addition, assembly efficiency is low because the screws or nuts and bolts should be assembled one by one. Furthermore, the housings of the electronic device can be detached from each other easily because of easy access to the screws and the nuts and bolts and any visible indication of this intrusion may not be possible. Thus, the electronic device can be disassembled and valuable intellectual property can be duplicated or copied easily.

Therefore, a latching mechanism, for housings of electronic devices, which is easy to assembly, and thereby reducing assembling time, and difficult to be detached from an electronic device without damaging components and/or the latching mechanism is desired.

SUMMARY

An electronic device includes a first component, a second component connected to the first component and a latching mechanism for connecting a first component and a second component. The latching mechanism includes the second component forming two first engaging portions, two latch holders fixed relative to the first component, a first latch-clasping piece extending from each latch holder and two first latching members having two second engaging portions. Each second engaging portion engaging with one of the first engaging portions of the second component, and the first engaging portion of the second component and the first latching member disposed between the first latch-clasping piece of the latch holder and the first component. Each latch holder further includes two second latch-clasping piece, each second latch-clasping piece leans against to the base of one of the first latching members and is disposed between the first latch-clasping piece of the latch holder and the first component. The first component defines two slots, each slot faces the first latch-clasping piece of one corresponding latch holder, and each first latching member includes a base received in the slot of the first component. Each first latching member further includes two resilient member extended from the base and being parallel to the base, and the second engaging portion is defined in the resilient member.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present latching mechanism. Moreover, in the drawings, like reference numerals designate corresponding parts throughout the several views, and all the views are schematic.

DETAILED DESCRIPTION OF THE EMBODIMENTS

The present invention provides a latching mechanism. The latching mechanism is usually employed in electronic devices such as mobile phones, personal digital assistants, and laptop computers. The electronic devices include two housings that need to be connected together. It can be understood that the latching mechanism may also be used to connect two other components other than housings.

Figure 1:
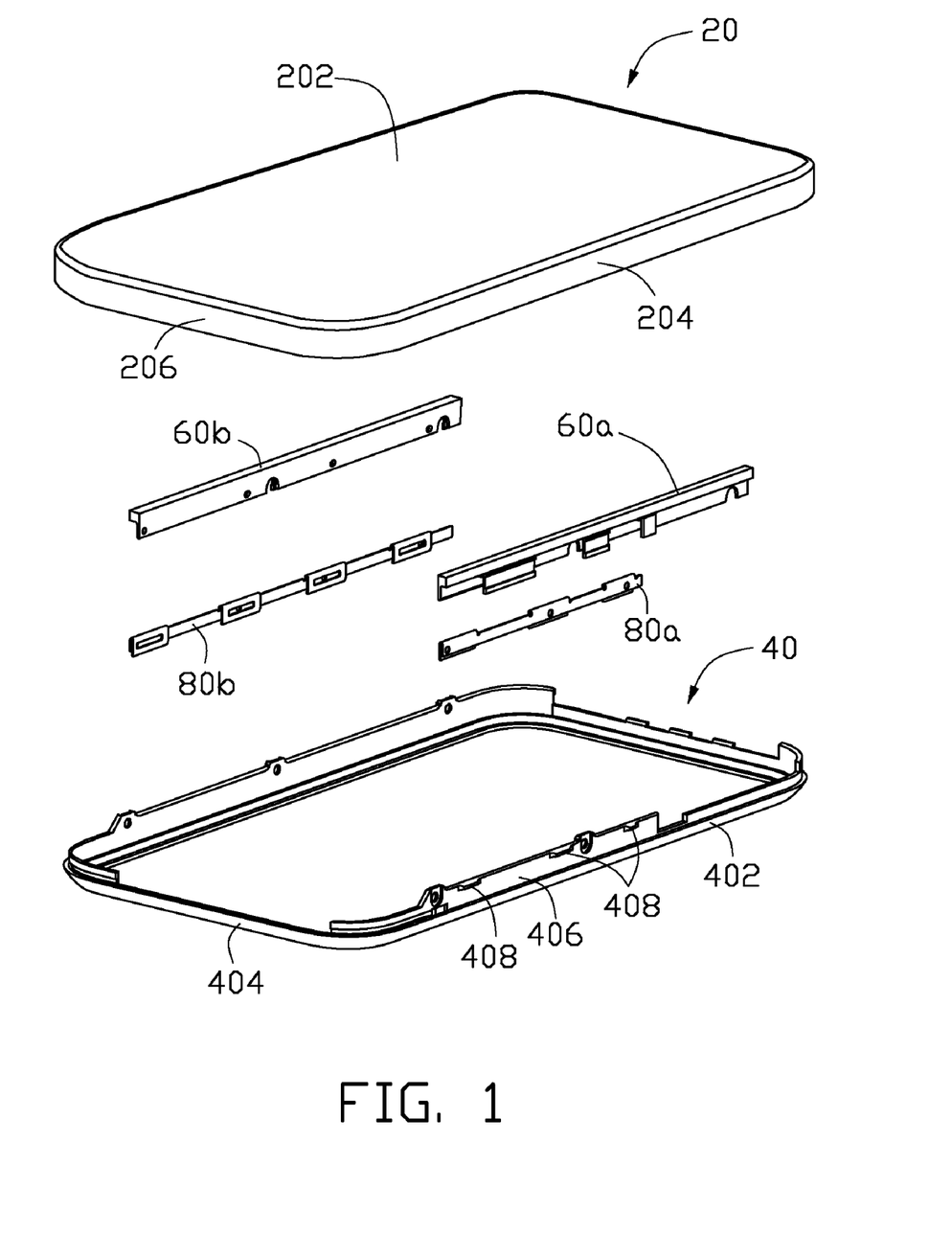
FIG. 1 is an exploded, isometric view of a latching mechanism for housings of an electronic device connected by the latching mechanism of the present invention.

Referring to FIG. 1, the latching mechanism used to connect a first housing 20 and a second housing 40 includes latch holders 60a, 60b, and first latching members 80a, 80b.

Figure 2:
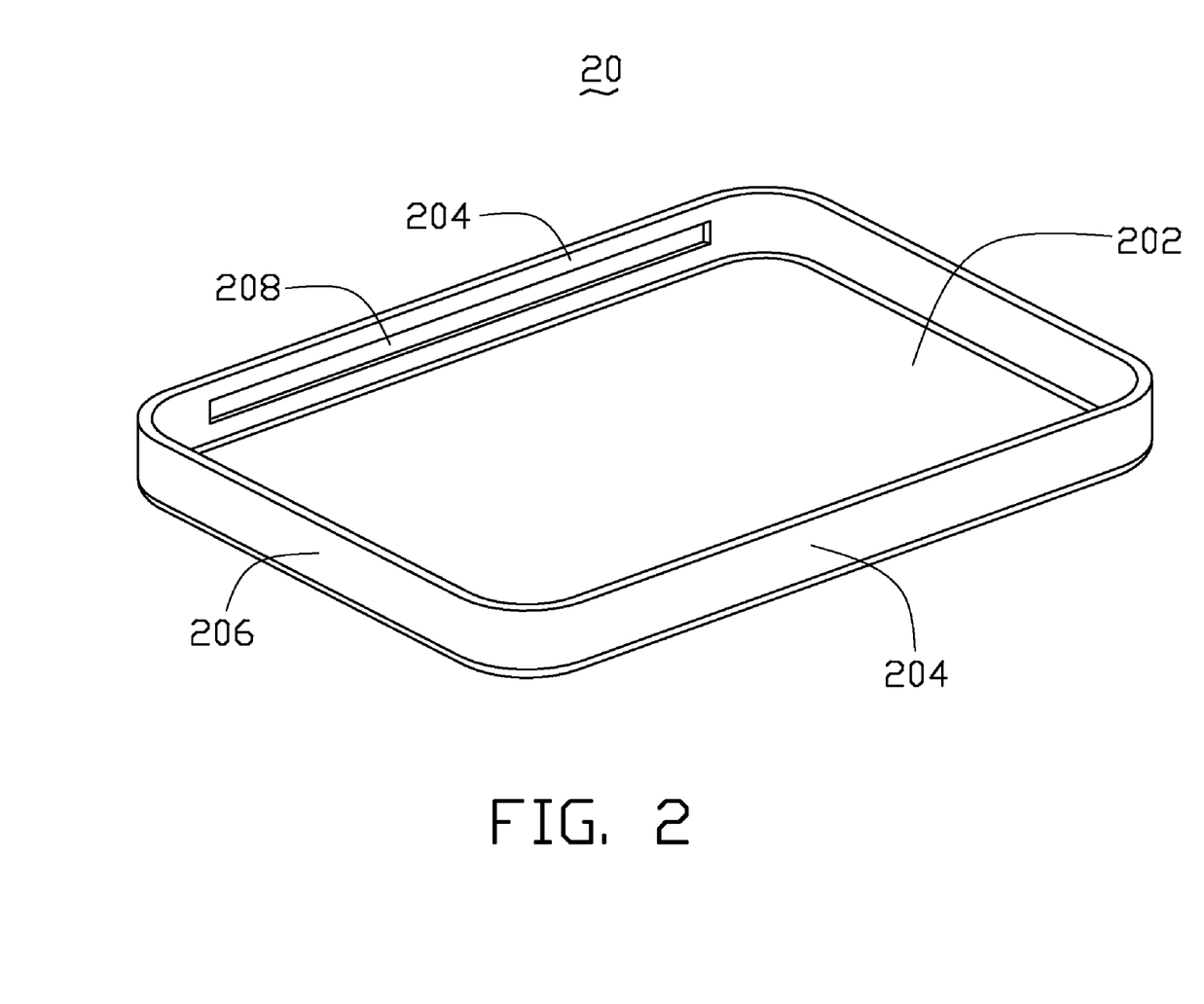
FIG. 2 is an isometric view of a first housing of the electronic device of FIG. 1.

Also referring to FIG. 2, the first housing 20 is approximately a rectangular-shaped member. The first housing 20 includes a bottom base 202, two first sidewalls 204 extending perpendicularly from two opposite sides of the base 202, and two second sidewalls 206 extending perpendicularly from another two opposite sides of the bottom base 202. The second sidewalls 206 are joining to the first sidewalls 204 correspondingly, and the second sidewalls 206 are perpendicular to the first sidewalls 204. A slot 208 is defined in each of the first sidewalls 204 from an inner side of the first sidewalls 204. The first housing 20 may be other shapes different from a rectangle.

The second housing 40 is approximately a rectangular-shaped frame. The second housing 40 includes two first rims 402 disposed at two opposite sides of the housing 40 and two second rims 404 disposed at another two opposite sides. The second rims 404 are joining to the first rims 402 correspondingly, and the second rims 404 are perpendicular to the first rims 402. A second latching member 406 extends from each of the first rims 402, and at least one hooking member 408 extends from each of the second latching member 406. The at least one hooking member 408 extends outwards of the second housing 40 perpendicularly. In the embodiment, three hooking members 408 extend from each of the second latching members 406.

Figure 3:
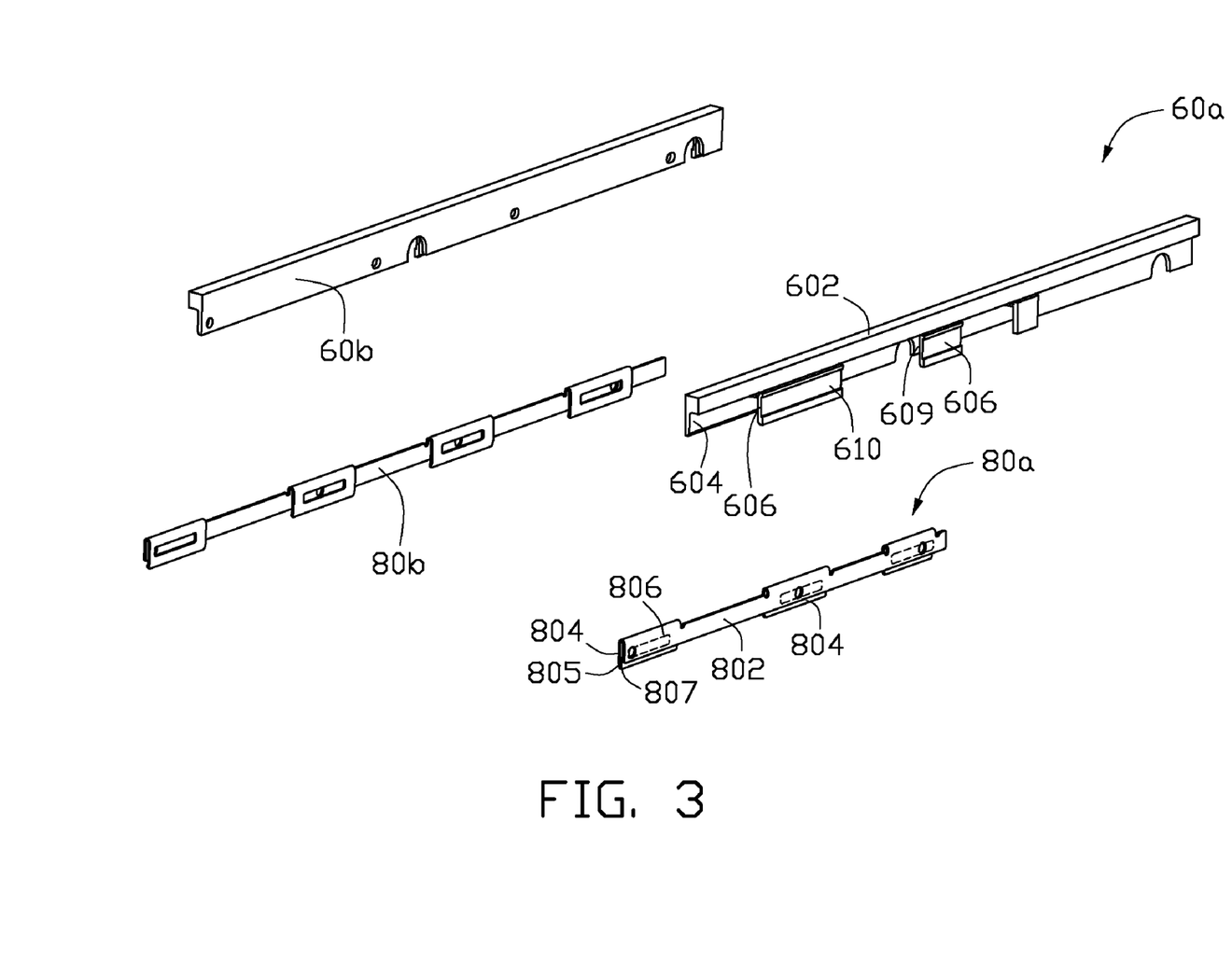
FIG. 3 is an exploded, isometric view of the latching mechanism of FIG. 1.
Figure 4:
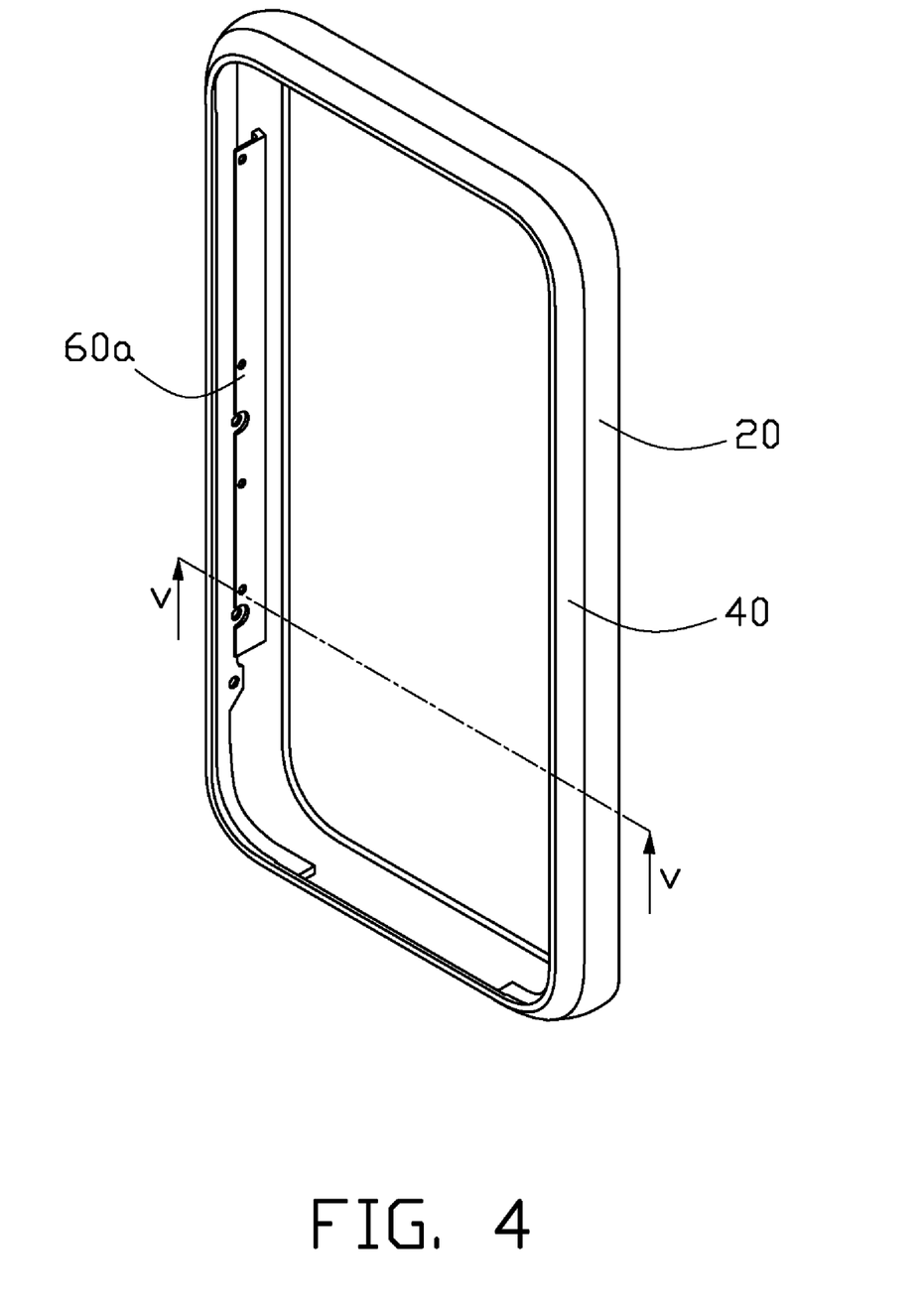
FIG. 4 is an assembled, isometric view of the latching mechanism and the housings of FIG. 1.
Figure 5:
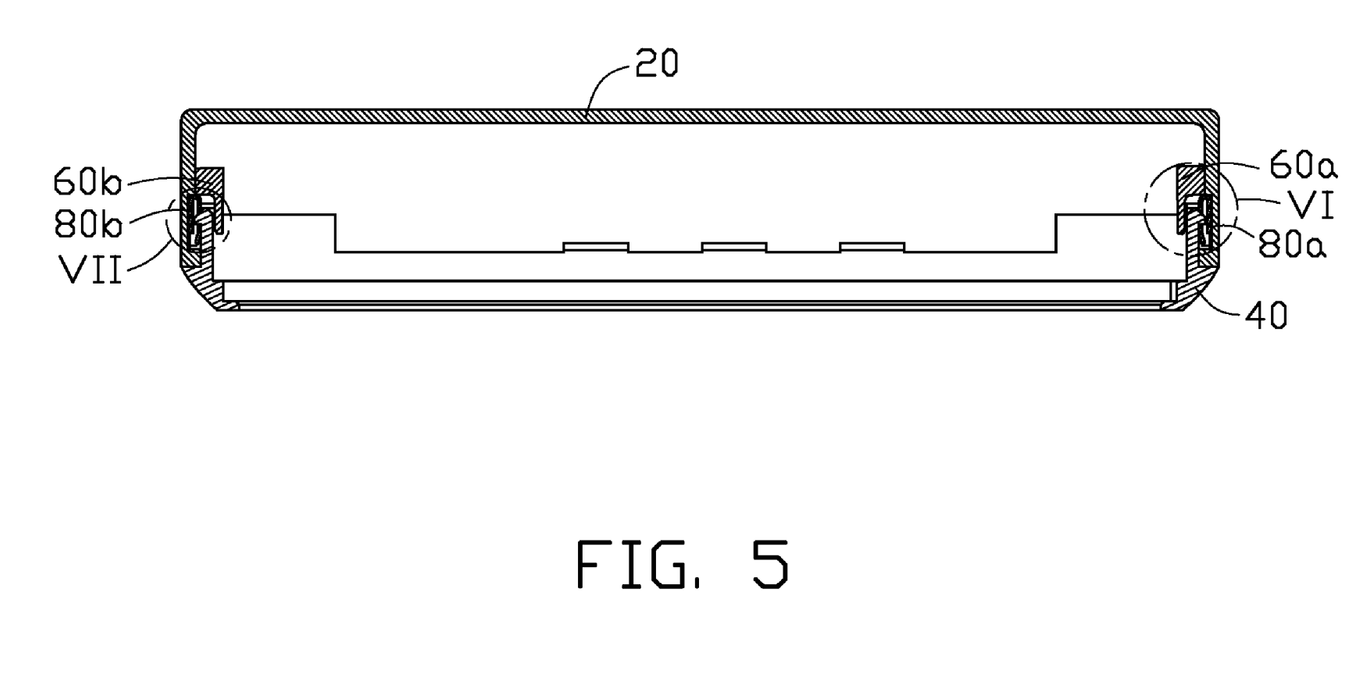
FIG. 5 is a side cross-sectional view of the latching mechanism connecting the housings along line V-V of FIG. 4.

Referring to FIG. 1 and FIG. 3, the latch holder 60a includes a main portion 602, a first latch-clasping piece 604, and a plurality of second latch-clasping pieces 606 spaced from each other in a first predetermined manner. In the embodiment, the latch holder 60a includes two second latch-clasping pieces 606. The main portion 602 is an elongated strip. The first latch-clasping piece 604 extends from a lateral edge of the latch holder 60a. The second latch-clasping pieces 606 extend from another lateral edge of the latch holder 60a opposite to the first latch-clasping piece 604 and on a same side of the latch holder 60a. The first latch-clasping piece 604 is an elongated strip. An interspace 609 is defined between the first latch-clasping piece 604 and the second latch-clasping pieces 606. A groove 610 is defined in each second latch-clasping piece 606.

The first latching member 80a includes a base 802 and a plurality of resilient members 804 spaced apart from each other in the first predetermine manner corresponding the second latch-clasping pieces 606. In the embodiment, the first latching member 80a includes three resilient members 804. The base 802 is an elongated strip. Each of the resilient members 804 extends from a side of the base 802 and immediately forms a 180 degrees U-shaped bend relative to the base 802. A clearance 807 is defined between the base 802 and the resilient members 804. An end of each resilient member 804 is bended slightly towards a direction of the base 802, thereby forming a resilient slider 805. A hook catch hole 806 is defined in each of the resilient members 804. The first latching member 80a is elastic so that the resilient members 804 can bend slightly towards to or away from the base 802 under an external force.

Referring to FIGS. 3-6, when assembling the first and second housings 20, 40 together, firstly, the latch holder 60a and the first latching member 80a is aligned next to each other such that the base 802 of the first latching member 80a is received in the groove 610 of the latch holder 60a, and the resilient members 804 of the first latching member 80a are received in the interspace 609 of the latch holder 60a and correspond to the grooves 610. Then the latch holder 60a and the first latching member 80a are disposed at an internal side of one of the first sidewalls 204 of the first housing 20. The base 802 of the first latching member 80a is adjacent to the first sidewall 204 and received in one corresponding slot 208 of the first housing 20. Next, the latch holder 60a is fixed to the first housing 20. In this embodiment, the latch holder 60a is fixed to the first housing 20 by adhesive. However, the latch holder 60a may also be fixed by other means such as bolts or rivets. Finally, the second housing 40 is coupled to the first housing 20 such that the second latching members 406 of the second housing 40 and the hooking members 408 on the second latching member 406 enter a space defined between the first latch-clasping piece 604 correspondingly. The resilient sliders 805 guides the hooking members 408 and substantially deform the resilient members 804 as a whole by a pushing force of the hooking members 408 on the second housing 40. When the second housing 40 is pushed into a certain position such that the second latching member 406 is at a certain position of the space between the first latch-clasping piece 604 and resilient members 804 correspondingly, the hooking members 408 of the second housing 40 are hooked in the hook catch hole 806. The resilient members 804 of the first latching member 80a returns to a normal form at rest. Thereby, the second housing 40 is securely coupled to the first housing 20.

Figure 6:
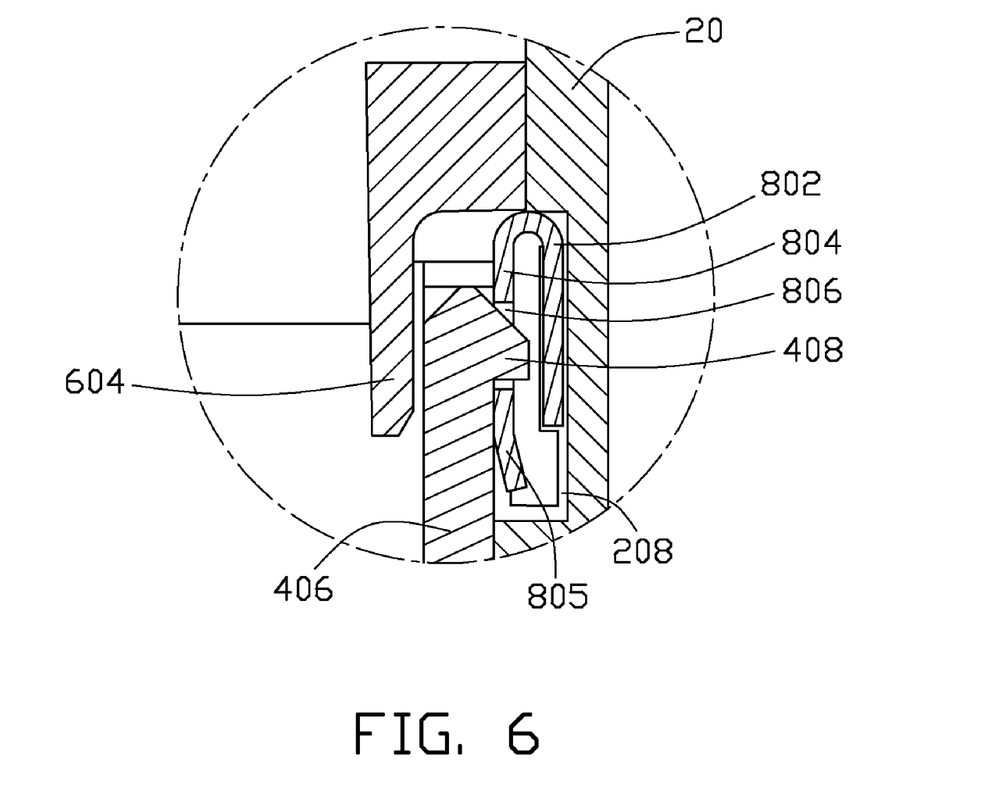
FIG. 6 is an enlarged view of a position VI of FIG. 5.
Figure 7:
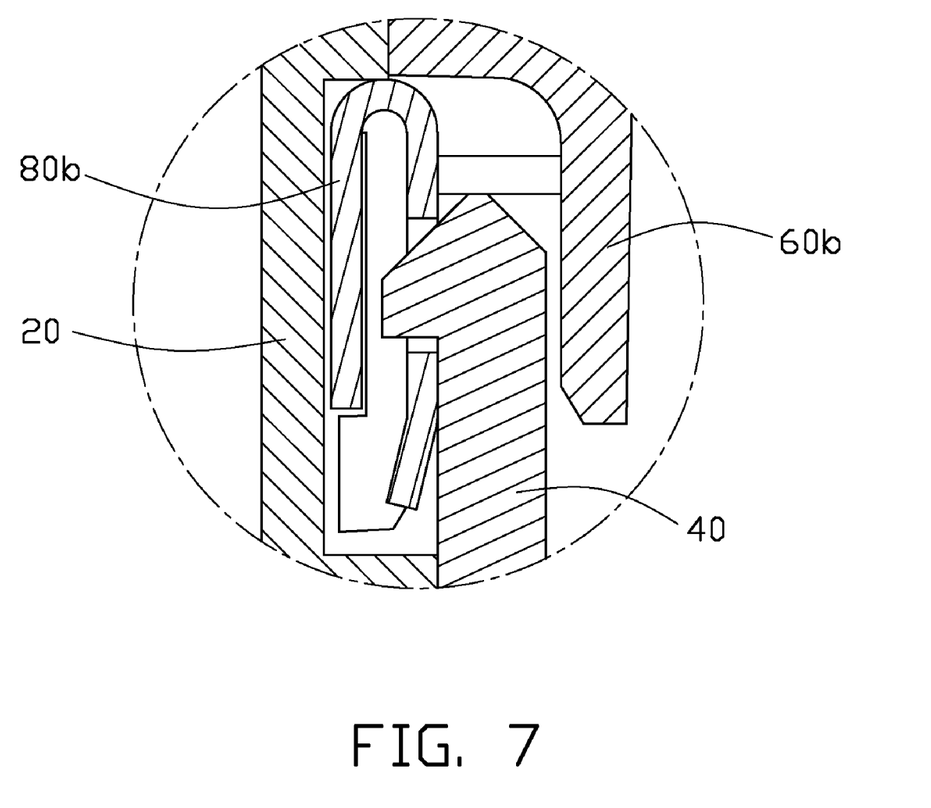
FIG. 7 is an enlarged view of a position VII of FIG. 5.

Referring to FIG. 3, a structure of the latch holder 60b is similar to that of the latch holder 60a, and a structure of the first latching member 80b is similar to that of the first latching member 80a. Referring to FIG. 6 and FIG. 7, engagement mechanisms of the latch holder 60b and the first latching member 80b are the same as the engagement mechanisms of the latch holder 60a and the first latching member 80a. The latch holder 60b and the first latching member 80b engages with another first sidewall 204 of the first housing 20 and another second latching member 406 of the second housing 40 in a same manner as the latch holder 60a and the first latching member 80a engaging with the first and second housings 20, 40. After assembly, the latch holders 60a, 60b, the first latching members 80a, 80b, the slots 208 of the first housing 20, and the hooking members 408 of the second housing 40 cooperatively connect the first and second housings 20, 40 together. The hooking members 408 of the second housing 40 and the first latching members 80a, 80b are set between the first housing 20 and the latch holders 60a, 60b fixed to the first housing 20 and are not exploded. Therefore, an engagement between the second housing 40 and the first latching members 80a, 80b cannot be disassembled without damaging any components of the first and second housings 20, 40, the first and latch holders 60a, 60b, or the first and first latching members 80a, 80b. It can be seen that the first and second housings 20, 40 cannot be disassembled without damaging such components.

Figure 8:
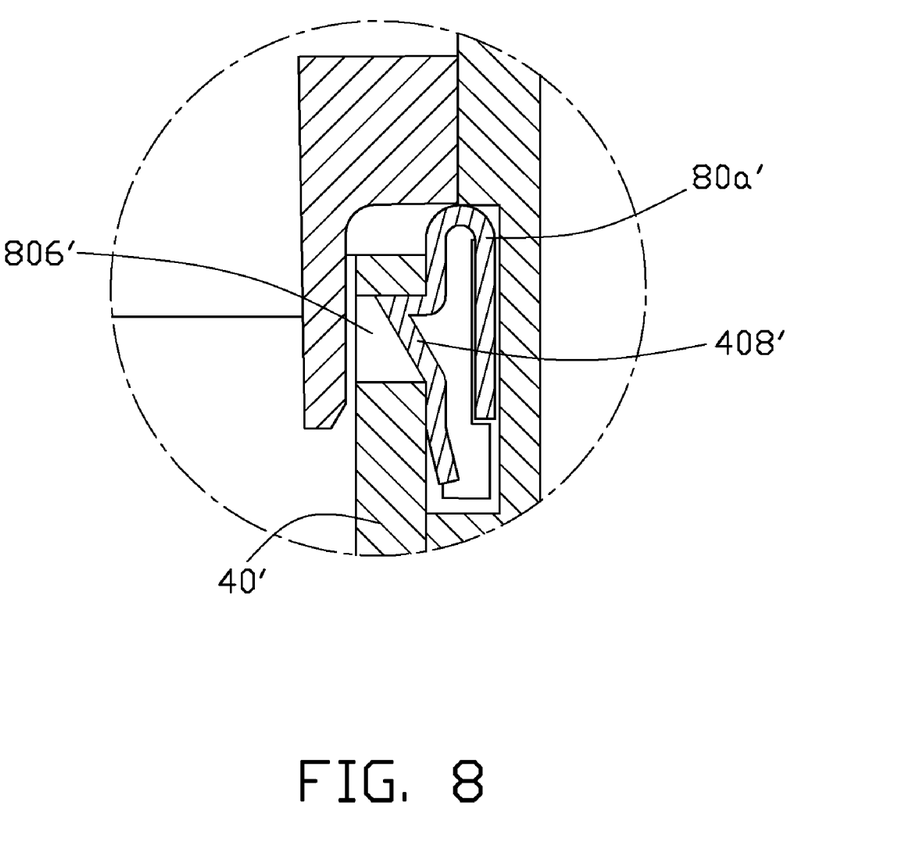
FIG. 8 is an enlarged view of another embodiment of the latching mechanism.

Alternatively, other catching mechanisms can be formed on the first and second housings 20, 40 in order to connect the first and second housings 20, 40 more securely. The first latching members 80a, 80b may also be fixed on the first housing 20. The latch holders 60a, 60b and the first latching members 80a, 80b can be integrally formed with the first housing 20. FIG. 8 shows another embodiment of a latching mechanism similar to the latching mechanism illustrated above, however, the latching mechanism includes a hooking member 408' formed on a first latching members 80a', and a hook catch hole 806' defined in a second housing 40' correspondingly.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:
1. An electronic device comprising:
a first component;
a second component connected to the first component, the second component forming two first engaging portions; and
a latching mechanism for connecting the first component and the second component, the latching mechanism comprising:
two latch holders fixed relative to the first component, a first latch-clasping piece extending from each latch holder; and
two first latching members having two second engaging portions, wherein each second engaging portion engaging with one of the first engaging portions of the second component, and the first engaging portion of the second component and the first latching member disposed between the first latch-clasping piece of the latch holder and the first component, the first component defines two slots, each slot faces the first latch-clasping piece of one corresponding latch holder, and each first latching member comprises a base received in the slot of the first component, each latch holder further comprises two second latch-clasping piece, each second latch-clasping piece leans against the base of one of the first latching members and is disposed between the first latch-clasping piece of the latch holder and the first component, each first latching member further comprises two resilient members extended from the base and being parallel to the base, and the second engaging portion is defined in the resilient member.

2. The electronic device as claimed in claim 1, wherein the first engaging portion is a hooking member extending from an outer side of the second component and the second engaging portion is a hook catch hole defined in the first latching member.

3. The electronic device as claimed in claim 1, wherein the first engaging portion is a hook catch hole defined in the second component and the second engaging portion is a hooking member extending from the first latching member.

4. The electronic device as claimed in claim 1, wherein an interspace is defined between the first latch-clasping piece and the second latch-clasping piece of the latch holder, a clearance is defined between the resilient member and the base of the first latching member, and the second latch-clasping piece of the latch holder is corresponding to a position of the clearance of the first latching member.

5. The electronic device as claimed in claim 1, wherein each first latching member is elastic so that the base and resilient members can be forced slightly close to or apart from each other.

6. The electronic device as claimed in claim 4, wherein the latch holder further comprises a main portion, the main portion and the first latch-clasping piece are elongated strips, the first latch-clasping piece extends from a lateral edge of the latch holder, and the second latch-clasping pieces extend from another lateral edge of the latch holder opposite to the first latch-clasping piece and on a same side of the latch holder.

7. The electronic device as claimed in claim 1, wherein the first component is an approximately rectangular-shaped member, the first component has a bottom base, two first sidewalls extending from two opposite sides of the bottom base, and two second sidewalls extending perpendicularly from another two opposite sides of the bottom base and connecting the first sidewalls correspondingly.

8. The electronic device as claimed in claim 1, wherein the second component is approximately a rectangular-shaped frame, the second component comprises two first rims disposed at two opposite sides and two second rims disposed at another two opposite sides, the second rims are joined to the first rims, the second latching member extends from each of the first rims, and each first engaging portion extends from each second latching member, the at least one first engaging portion extends toward an outside of the second component.

* * * * *